United States Patent [19]
Nyberg et al.

[11] Patent Number: 5,532,893
[45] Date of Patent: Jul. 2, 1996

[54] PARALLELOGRAM-SHAPED LIFTER FOR CLEANING A FLEXIBLE MAGNETIC RECORDING DISC

[75] Inventors: Mark R. Nyberg, Wahpeton, N. Dak.; Gregory A. Laska, Woodbury, Minn.; Daniel J. Stetson, Menomonie, Wis.

[73] Assignee: Minnesota Mining and Manufacturing Company, St. Paul, Minn.

[21] Appl. No.: 341,762

[22] Filed: Nov. 18, 1994

[51] Int. Cl.$^6$ .................................................. G11B 23/03
[52] U.S. Cl. ........................................................ 360/133
[58] Field of Search .............................................. 360/133

[56] References Cited

U.S. PATENT DOCUMENTS

| | | |
|---|---|---|
| 4,510,546 | 4/1985 | Asami et al. . |
| 4,620,247 | 10/1986 | Papciak et al. . |
| 4,654,742 | 3/1987 | Harris et al. . |
| 4,672,499 | 6/1987 | Oishi et al. . |
| 4,677,516 | 6/1987 | Iizuka et al. . |
| 4,677,517 | 6/1987 | Gelardi et al. . |
| 4,739,433 | 4/1988 | Oishi . |
| 4,750,075 | 6/1988 | Oishi . |
| 4,768,123 | 8/1988 | Iizuka et al. . |
| 4,809,114 | 2/1989 | Seto . |
| 4,979,065 | 12/1990 | Ikebe et al. . |
| 5,083,231 | 1/1992 | Veenstra et al. . |
| 5,090,010 | 2/1992 | Takahashi . |
| 5,359,483 | 10/1994 | Arsenault et al. . |

OTHER PUBLICATIONS

Diagrams dated Dec. 12, 1991 showing Fuji and TDK lifter designs (2 pages).

*Primary Examiner*—A. J. Heinz
*Attorney, Agent, or Firm*—Gary L. Griswold; Walter N. Kirn; Eric D. Levinson

[57] ABSTRACT

A lifter for supporting a fabric liner of a flexible magnetic recording disc, such as a floppy diskette, so that the disc is cleaned by rotation of the disc with respect to the liner. The lifter is in the shape of a parallelogram having interior angles of about 85° and 95°. The lifters are cut from a length of planar, polyester material with a single, straight cut, so that all of the material is used to make the lifters, thereby minimizing wastage of material during the production of lifters for floppy diskette cartridges.

11 Claims, 2 Drawing Sheets

PARALLELOGRAM-SHAPED LIFTER FOR CLEANING A FLEXIBLE MAGNETIC RECORDING DISC

FIELD OF THE INVENTION

The present invention relates generally to flexible magnetic recording disc cartridges, and more specifically to a lifter for lifting a fabric liner in such cartridges to contact and thereby clean a disc in the cartridge.

BACKGROUND OF THE INVENTION

Floppy magnetic recording discs are flexible discs of polyester resin or the like having a magnetic layer on each side thereof on which information is recorded by a magnetic head. Floppy discs which have a diameter of 3½ inches (8.9 cm) or less are known as micro-floppy discs. Generally, the micro-floppy disc is accommodated in a hard casing to form a cartridge. The micro-floppy disc comprises a circular magnetic recording medium which is thin, has a small diameter, and has a hub fixed to the center of the recording medium.

The cartridge generally includes a fabric liner on both inner surfaces of the casing. The liner is kept in contact with the recording surface of the disc to remove debris on the recording surface while the disc is rotated. The liner has a width at least equal to the width of the recording region of the disc, and is kept pressed against the entire width of the recording surface by a lifter which is secured to the inner surface of the casing.

SUMMARY OF THE INVENTION

The present invention includes a lifter for supporting a fabric liner for a flexible magnetic recording disc (e.g., a floppy diskette) so that the disc is cleaned by rotation of the disc with respect to the liner. The lifter is in the shape of a parallelogram and is formed from a planar sheet. The parallelogram-shape of the lifter allows it to be manufactured with a minimum of wasted materials during the production of magnetic disc cartridges.

The parallelogram-shaped lifter preferably has interior angles of 82° to 87° and 93° to 98°, and more preferably has interior angles of about 85° and 95°. The lifter is preferably made of polyester.

The present invention also includes a floppy magnetic recording disc cartridge (e.g., a floppy diskette cartridge) having a pair of cartridge shells, a pair of fabric liners on the inner surfaces of the shells, a flexible magnetic recording disc provided between the fabric liners, and the lifter described above. The lifter is secured to the inner surface of one of the cartridge shells and forces the fabric liners into contact with the flexible recording disc.

The present invention also includes a method of cleaning a flexible magnetic recording disc in the cartridge described above. The method includes the steps of forcing the fabric liner against the disc with the lifter described above, and rotating the disc with respect to the cartridge and fabric liner, thereby cleaning the disc.

The present invention also includes a method of making the lifters described above. The method includes the steps of providing a planar lifter material having a length which is large compared to its width, and cutting parallelogram-shaped lifters from the lifter material with a single, straight cut extending across the width of the lifter material. This method allows all of the lifter material to be used without any wastage in the production of the lifters.

As used herein, the term "parallelogram" means a four-sided planar figure with opposite sides parallel and wherein none of the sides are at right angles (90°) with respect to each other. In other words, a rectangle (or square) is specifically excluded from the definition of a parallelogram as used herein.

BRIEF DESCRIPTION OF THE DRAWINGS

The present invention will be further understood with reference to the accompanying drawing wherein.

DETAILED DESCRIPTION

Figure 1:
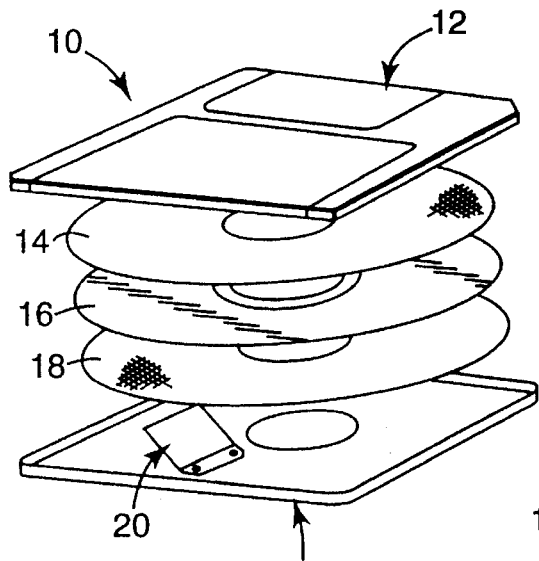
FIG. 1 is a perspective, exploded view of a prior art micro-floppy magnetic recording disc cartridge.

A prior art micro-floppy magnetic recording disc cartridge 10 is shown in FIG. 1. The cartridge 10 is comprised of two outer casings 12 and 19 which enclose a floppy magnetic recording disc 16. The casings 12 and 19 each have a fabric liner 14 and 18, respectively, on their inner surface which approximates the shape of the disc 16. A prior art lifter 20 is affixed to the inner surface of the casing 19 and applies an upward pressure on the fabric liner 18 which causes the fabric to rub against the disc 16, thereby cleaning the disc as it is rotated in the cartridge 10.

Figure 2:
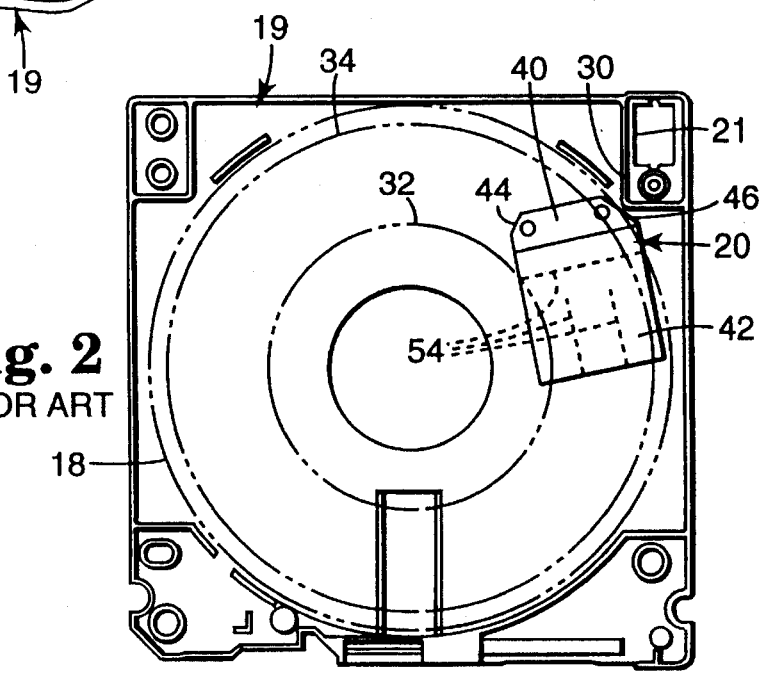
FIG. 2 is an overhead view of the inside surface of a prior art magnetic disc cartridge.

The inner surface of casing 19 is shown in more detail in FIG. 2. Lifter 20 has a foot 40 secured to the inner surface of casing 19 and a head 42 biased at angle of about 6° to 8° with respect to the casing so that the head forces fabric liner 18 up against floppy disc 16. Foot 40 may be attached to the inner surface of cartridge casing 19 by an adhesive, fusion bonding, ultrasonic welding, peening, or by other methods known to those skilled in the art. Raised ridges 54 (shown in dashed lines in FIG. 2) are provided on the inner surface of casing 19 beneath lifter 20.

Floppy disc 16 has an innermost data track 32 and an outermost data track 34. The tip of head 42 spans the width between data tracks 32 and 34.

Although prior art lifter 20 is generally rectangular-shaped, two corners 44 and 46 of foot 40 are removed. Corner 46 of lifter 20 is removed to allow the lifter to be positioned appropriately despite the presence of a retaining wall 30 on the inner surface of casing 19. Retaining wall 30 is provided at a corner 21 of the inner surface of cartridge casing 19 to allow for the insertion of a write protect switch (not shown).

Figure 3:
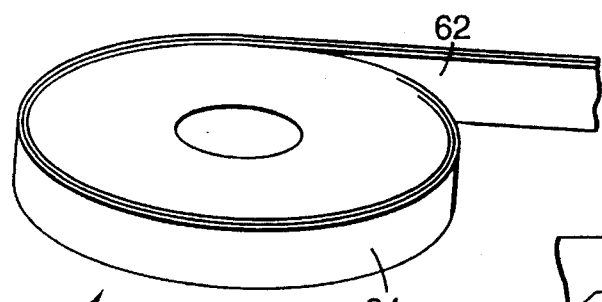
FIG. 3 is a perspective view of a prior art roll of lifter material.
Figure 4:
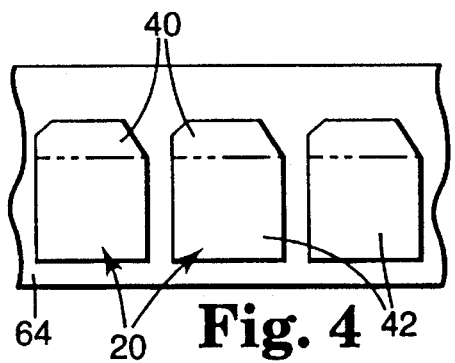
FIG. 4 is a close-up view of the prior art lifters of FIG. 2.

A roll of material for making prior art lifters 20 is shown in FIG. 3. Roll 60 comprises a length of carrier material 64, such as polyester, and lifter material 62 provided thereon. Lifters 20 are then cut out of lifter material 62, as shown in FIG. 4. The portion of lifter material 62 which is not cut out to form lifters 20 is discarded. After lifters 20 are removed from carrier material 64, the carrier material is also discarded. This typically results in wasting about 60% of all of the material that comprises roll 60.

The present invention provides a lifter 120 which can be formed with a minimum of wasted material.

Figure 5:
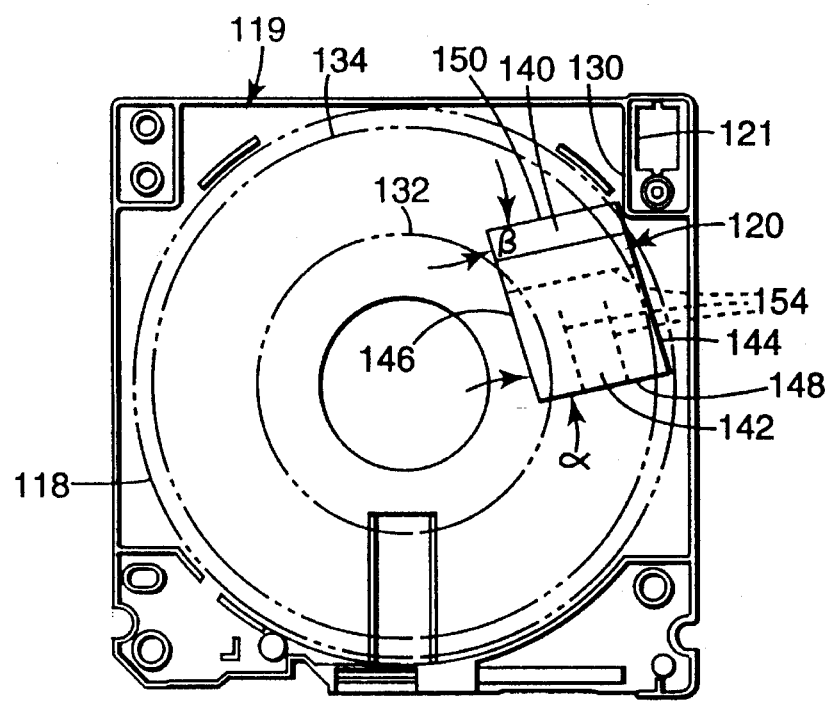
FIG. 5 is an overhead view of the inside surface of a magnetic disc cartridge according to the present invention.

The inner surface of a magnetic recording disc cartridge casing 119 according to the present invention is shown in FIG. 5. A lifter 120 has a foot 140 and a head 142. Lifter 120 is bounded along its width by outer side 144 and inner side 146 and along its length by leading edge 148 and trailing edge 150. Head 142 is biased at an angle of about 3° to 13°, and more preferably about 6° to 8°, with respect to the inner surface of casing 119 so that the head forces a fabric liner 118 up against a floppy magnetic recording disc (not shown). Foot 140 may be attached to the inner surface of cartridge casing 119 by an adhesive, fusion bonding, ultrasonic welding, peening, or by other methods known to those skilled in the art. Raised ridges 154 (shown in dashed lines in FIG. 5) are provided on the inner surface of casing 119 beneath lifter 120.

The floppy disc (not shown, but which is identical to floppy disc 16) has an inner most data track 132 and an outermost data track 134. Leading edge 148 of head 142 spans the width between data tracks 132 and 134.

Figure 7:
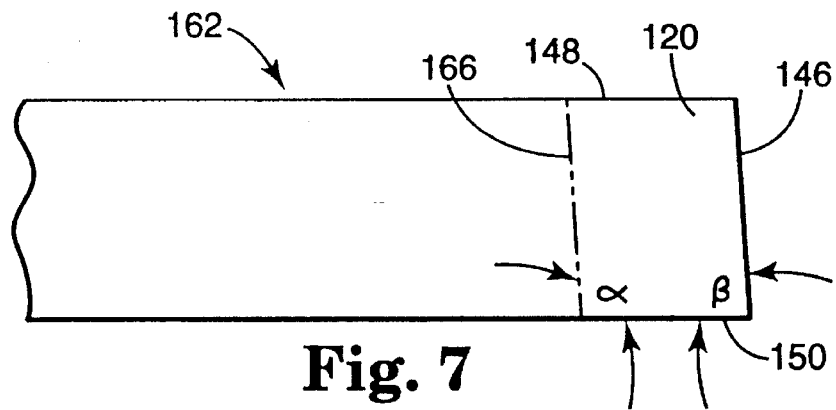
FIG. 7 is a close-up view of a lifter to be cut from the lifter material of FIG. 6 according to the present invention.

Lifter 120 is parallelogram-shaped, i.e., sides 144 and 146 are parallel to each other, and edges 148 and 150 are parallel to each other, but the sides of the lifter are not perpendicular to the edges. Angle α, shown in FIGS. 5 and 7, is preferably less than 125° and preferably more than 92°. More preferably, angle α is between about 93° and 98°, more preferably between 94° and 96°, and most preferably about 95°. Angle β, as shown in FIGS. 5 and 7, is defined as 180°−α, and thus is preferably greater than 55°, less than 88°, and more preferably between 82° and 87°, still more preferably between 84° and 86°, and most preferably about 85°. Due to the fact that neither angle α nor angle β is equal to 90° (i.e., lifter 120 is not a rectangle) lifter 120 may be used without having to remove a corner from it to avoid a retaining wall 130 at a corner 121 of cartridge casing 119, as is needed with prior art lifters 20 shown in FIGS. 2 and 4.

Figure 6:
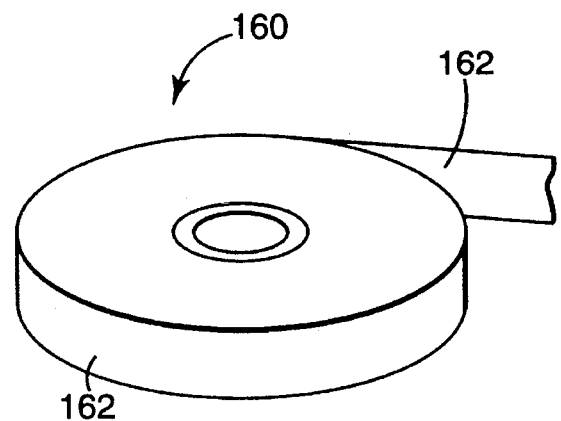
FIG. 6 is a perspective view of a roll of lifter material according to the present invention.

A roll of material for making lifters 120 is shown in FIG. 6. Roll 160 comprises a length of material such as stainless steel or aluminum, or plastics such as polyester, including polyester terephthalate (PET). As shown in FIG. 7, lifters 120 are cut from lifter material 162 on roll 160 along dashed line 166.

Due to the parallelogram shape of lifters 120, the lifters may be stamped from material 162 without any loss of material. Thus, inner (right) side 146 of one lifter 120 is the same as outer (left) side 144 of an adjacent lifter. This allows each lifter 120 to be cut from material 162 with a single, straight cut 166 which extends across the width of the material. Of course, each lifter 120 may be cut so that its length or its width is determined by the width of material 162.

The lifter design of the present invention eliminates the need for any type of carder for the lifter material (such as carder 64 in FIGS. 3 and 4), and thus minimizes the wasting of the carder material.

Lifter 120 is preferably about 27 mm in length and about 20 mm wide. Lifter 120 should be placed on the inner surface of casing 119 in a manner similar to prior art lifters, such as lifter 20 shown in FIG. 2. Care should be taken to ensure that leading edge 148 of lifter 120 spans the width of a floppy disc between innermost data track 132 and outermost data track 134, while also ensuring that retaining wall 130 at corner 121 of casing 119 does not interfere with the placement of the lifter.

We claim:

1. A lifter for supporting a fabric liner of a flexible magnetic recording disc so that the disc is cleaned by rotation of the disc with respect to the liner, wherein the lifter is parallelogram-shaped, wherein none of the four sides of the lifter are at right angles with respect to each other.

2. The lifter of claim 1, wherein the parallelogram-shaped lifter has interior angles of about 82° to 87° and of about 93° to 98°.

3. The lifter of claim 1, wherein the parallelogram-shaped lifter has interior angles of about 85° and 95°.

4. The lifter of claim 3, wherein the lifter comprises polyester.

5. A floppy magnetic recording disc cartridge, comprising:
   a pair of disc cartridge casings;
   a pair of fabric liners provided on an inner surface of the casings;
   a floppy magnetic recording disc provided between the pair of fabric liners; and
   a parallelogram-shaped lifter formed from a planar sheet, wherein none of the four sides of the lifter are at right angles with respect to each other, wherein the lifter is secured to the inner surface of one of the casings whereby the lifter forces the fabric liners into contact with the magnetic recording disc, thereby cleaning the disc when the disc is rotated in the cartridge.

6. The cartidge of claim 5, wherein the parallelogram-shaped lifter has interior angles of about 82° to 87° and of about 93° to 98∞.

7. The cartidge of claim 5, wherein the parallelogram-shaped lifter has interior angles of about 85° and 95°.

8. The cartridge of claim 7, wherein the lifter comprises polyester.

9. A method of cleaning a flexible magnetic recording disc in a cartridge having a fabric liner in radial contact with the recording region of the disc, comprising the steps of:
   forcing the fabric liner against the disc with a parallelogram-shaped lifter, wherein the lifter is formed from a planar sheet, wherein none of the four sides of the lifter are at right angles with respect to each other; and
   rotating the disc with respect to the cartridge and fabric liner, whereby the disc is cleaned.

10. A lifter for supporting a fabric liner of a flexible magnetic recording disc so that the disc is cleaned by rotation of the disc with respect to the liner, wherein the lifter is parallelogram-shaped and has interior angles of about 82° to 87° and of about 93° to 98°.

11. A floppy magnetic recording disc cartridge, comprising:
   a pair of disc cartridge casings;
   a pair of fabric liners provided on an inner surface of the casings;
   a floppy magnetic recording disc provided between the pair of fabric liners; and
   a parallelogram-shaped lifter having interior angles of about 82° to 87° and of about 93° to 98°, wherein the lifter is secured to the inner surface of one of the casings whereby the lifter forces the fabric liners into contact with the magnetic recording disc, thereby cleaning the disc when the disc is rotated in the cartridge.

* * * * *

UNITED STATES PATENT AND TRADEMARK OFFICE
CERTIFICATE OF CORRECTION

PATENT NO. : 5,532,893
DATED : July 2, 1996
INVENTOR(S) : Nyberg et al.

It is certified that error appears in the above-indentified patent and that said Letters Patent is hereby corrected as shown below:

In the Abstract, line 1, "finer" should read --liner--.

Column 1, line 20, "castridge" should read --cartridge--.

Column 2, line 5, "fight" should read --right--.

Column 3, line 59, "carder" should read --carrier--.

Column 3, line 60, "carder" should read --carrier--.

Column 3, line 61, "carder" should read --carrier--.

Column 4, line 30, "cartidge" should read --cartridge--.

Column 4, line 33, "cartidge" should read --cartridge--.

Signed and Sealed this

Eighth Day of October, 1996

BRUCE LEHMAN

*Attest:*

*Attesting Officer*            *Commissioner of Patents and Trademarks*